(12) United States Patent
Chang (10) Patent No.: US 7,914,179 B2
(45) Date of Patent: Mar. 29, 2011

(54) OPTICAL PLATE WITH V-SHAPED PROTRUSIONS ON BOTH SIDES AND BACKLIGHT MODULE USING THE SAME

(75) Inventor: Shao-Han Chang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 281 days.

(21) Appl. No.: 12/317,990

(22) Filed: Dec. 31, 2008

(65) Prior Publication Data

US 2009/0109656 A1    Apr. 30, 2009

(30) Foreign Application Priority Data

Jun. 30, 2008 (CN) .......................... 2008 1 0302445

(51) Int. Cl.
*F21V 5/02* (2006.01)
*G09F 13/08* (2006.01)

(52) U.S. Cl. ....... 362/333; 362/97.1; 362/330; 362/339; 362/606; 362/620

(58) Field of Classification Search ................. 362/97.1, 362/223, 330, 333, 339, 606, 620
See application file for complete search history.

(56) References Cited

U.S. PATENT DOCUMENTS

| | | | |
|---|---|---|---|
| 7,445,361 B1* | 11/2008 | Hsu et al. | 362/333 |
| 7,628,514 B2* | 12/2009 | Hsu et al. | 362/333 |
| 7,712,945 B2* | 5/2010 | Hsu et al. | 362/620 |
| 7,715,132 B2* | 5/2010 | Chang | 359/831 |
| 2009/0323310 A1* | 12/2009 | Chang | 362/97.1 |

* cited by examiner

*Primary Examiner* — Stephen F Husar
*Assistant Examiner* — James W Cranson
(74) *Attorney, Agent, or Firm* — Clifford O. Chi (57) ABSTRACT

An optical plate includes a first surface and a second surface opposite to the first surface. A plurality of elongated, arc-shaped depressions is defined in the first surface. A plurality of first elongated, V-shaped protrusions aligned in a first direction and a plurality of second elongated, V-shaped protrusions aligned in a second direction are protruded from the second surface. The first direction and the second direction cooperatively define an angle which is larger than 0 degrees and less than 90 degrees.

20 Claims, 10 Drawing Sheets

OPTICAL PLATE WITH V-SHAPED PROTRUSIONS ON BOTH SIDES AND BACKLIGHT MODULE USING THE SAME

CROSS-REFERENCE TO RELATED APPLICATIONS

This application is related to five co-pending U.S. patent applications, which are: Ser. Nos. 12/319,007, 12/319,046, 12/319,045, 12/319,042, and 12/319,006, and all entitled "OPTICAL PLATE AND BACKLIGHT MODULE USING THE SAME". In the co-pending applications, the inventor is Shao-Han Chang. The co-pending applications have the same assignee as the present application. The disclosure of the above identified applications is incorporated herein by reference.

BACKGROUND

1. Technical Field

The present disclosure relates to an optical plate and a backlight module using the optical plate.

2. Description of the Related Art

Figure 8:
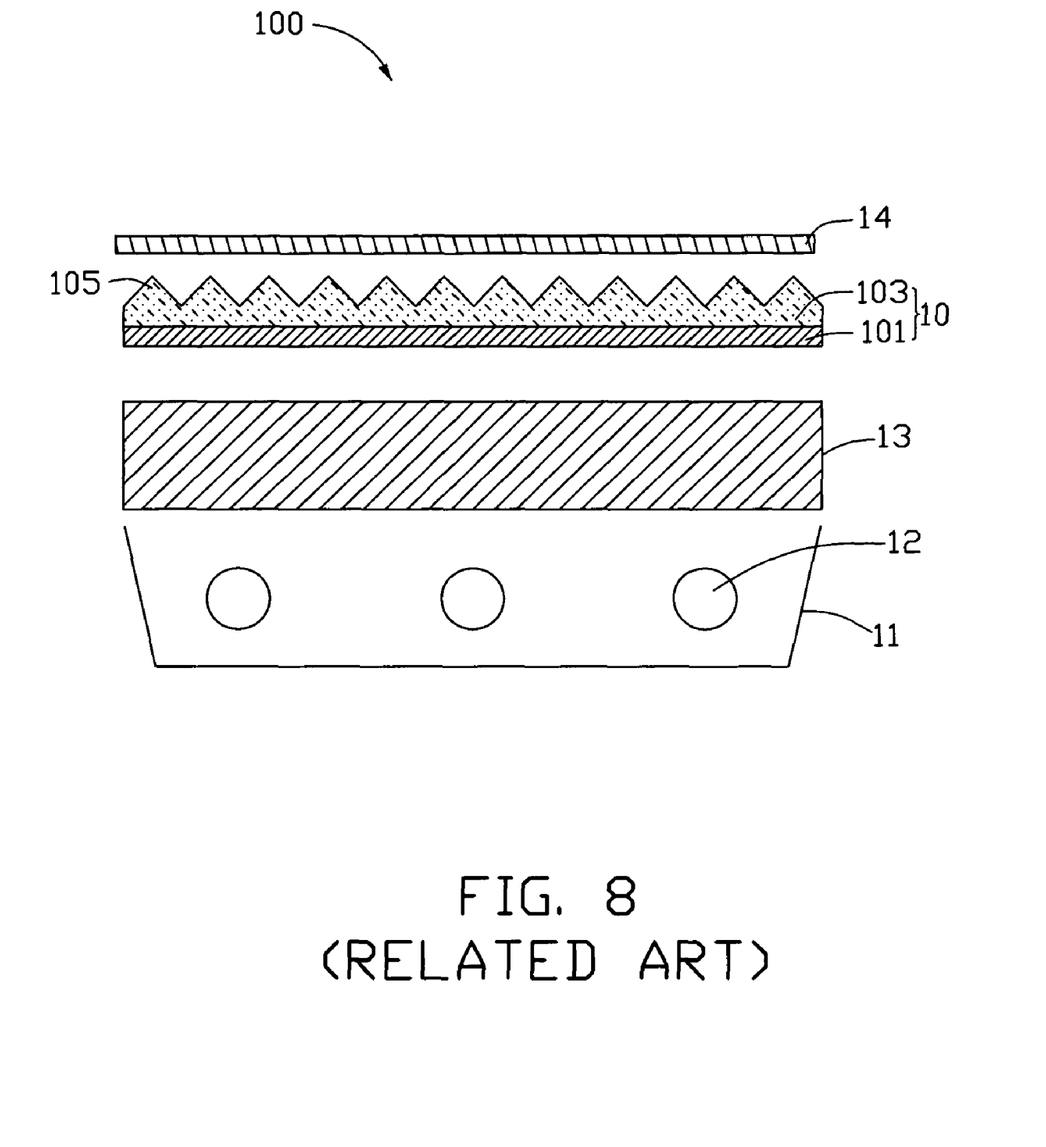
FIG. 8 is a side, cross-sectional view of a typical backlight module employing a typical prism sheet.

Referring to FIG. 8, a typical direct type backlight module 100 includes a frame 11, a plurality of lamps 12 positioned above a base of the frame 11, a light diffusion plate 13, and a prism sheet 10 stacked on top of the frame 11 in that order. Inside walls of the frame 11 are configured for reflecting certain of the light upwards. The light diffusion plate 13 includes a plurality of dispersion particles (not shown) for scattering light to enhance the uniformity of light exiting the light diffusion plate 13.

Figure 9:
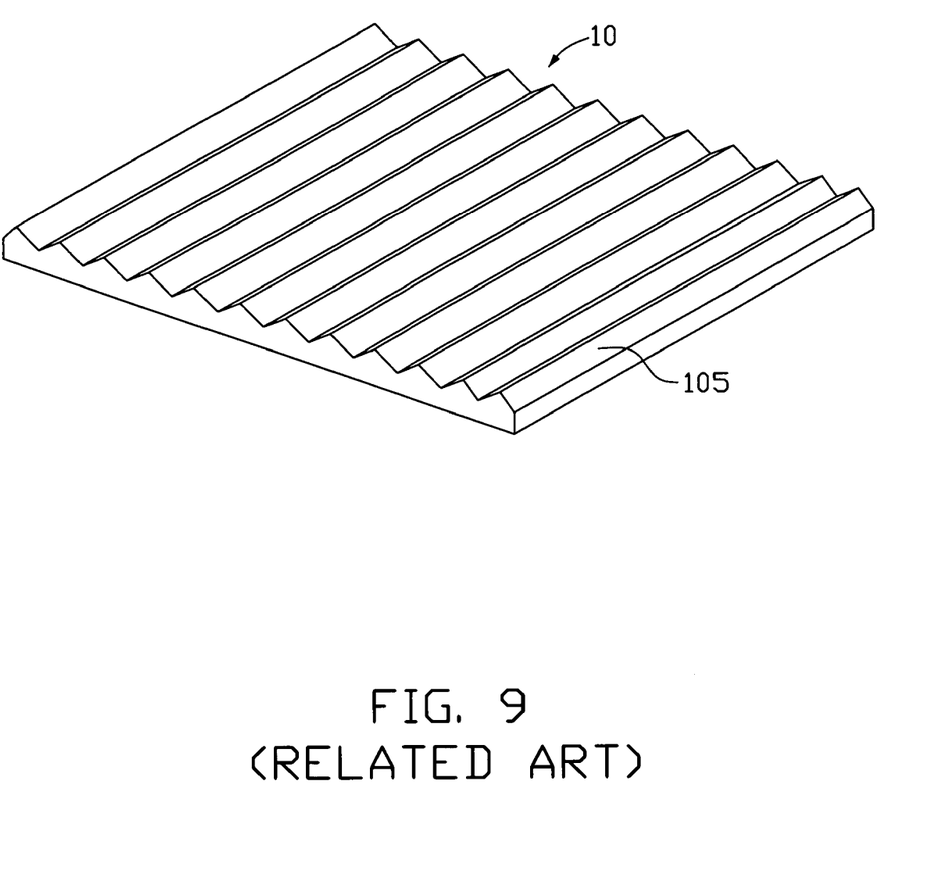
FIG. 9 is an isometric view of the typical prism sheet shown in FIG. 8.

Referring to FIG. 9, the prism sheet 10 includes a base layer 101 and a prism layer 103 formed on the base layer 101. The prism layer 103 includes a plurality of parallel prism lenses 105 having a triangular cross section. The prism lenses 105 collimate received light. Typically, a method of manufacturing the prism sheet 10 includes coating the base layer 101 with a melted ultraviolet(UV)-cured transparent resin to form V-shaped lenses, then solidifying the melted UV-cured transparent resin to form the prism lenses 105.

In use, light from the lamps 12 enters the diffusion plate 13 and becomes scattered, before leaving the light diffusion plate 13 to the prism sheet 10. The scattered light then travels through the prism sheet 10 and is refracted out at the prism layer 103 of the prism lenses 105. Thus, the refracted light leaving the prism sheet 10 is concentrated at the prism layer 103 and a brightness (illumination) of the prism sheet 10 is increased. The refracted light then propagates into an LCD panel (not shown) positioned above the prism sheet 10.

However, although light from the light sources 12 enters the diffusion plate 13 and becomes scattered, strong light spots of the light sources 12 directly above the light sources 12 are often formed. Therefore, an upper diffusion film 14 may be positioned on the prism sheet 10 to reduce or eliminate light spots of the light sources 12. Although the upper light diffusion film 14 and the prism sheet 10 are in contact with each other, a plurality of air pockets may still exist around the boundaries of the light diffusion film 14 and the prism sheet 10. When the backlight module 100 is in use, light passes through the air pockets, and some of the light undergoes total reflection by the air pockets along one or more corresponding boundaries. In addition, the upper light diffusion film 14 may absorb a certain amount of the light from the prism sheet 10. As a result, a brightness of light illumination of the backlight module 100 is reduced.

What is needed, therefore, is a new optical plate and a backlight module using the optical plate that can overcome the above-mentioned shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
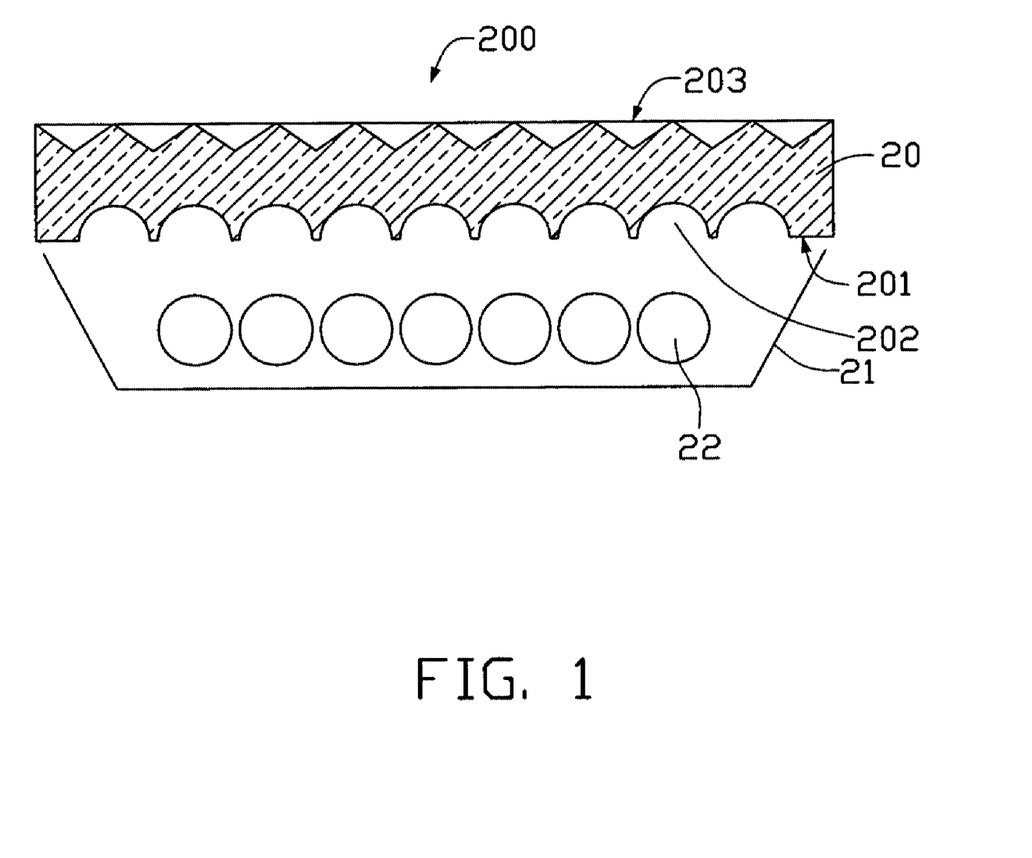
FIG. 1 is a cross-sectional view of one embodiment of a backlight module including a first embodiment of an optical plate.

Referring to FIG. 1, a first embodiment of a backlight module 200 includes an optical plate 20, a frame 21, and a plurality of lamps 22 regularly aligned above a base of the frame 21. The optical plate 20 is positioned on the top of the frame 21.

Figure 2:
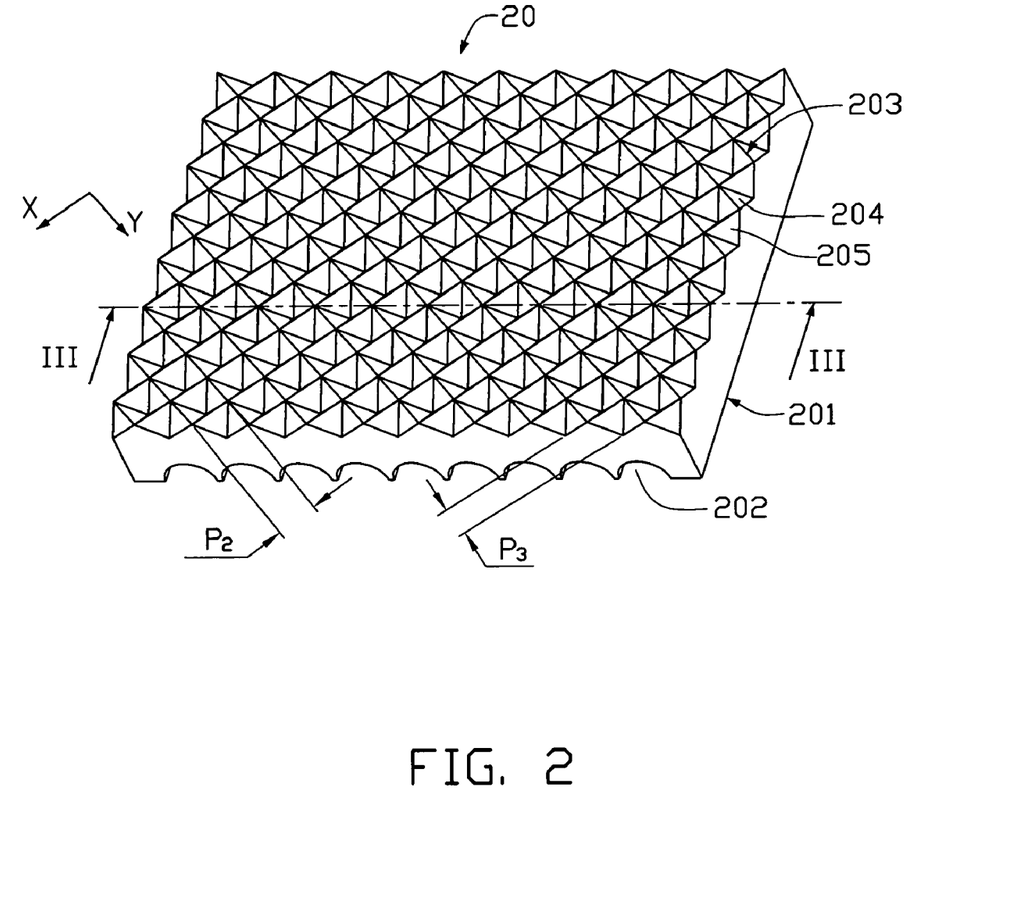
FIG. 2 is an isometric view of the optical plate of FIG. 1.
Figure 3:
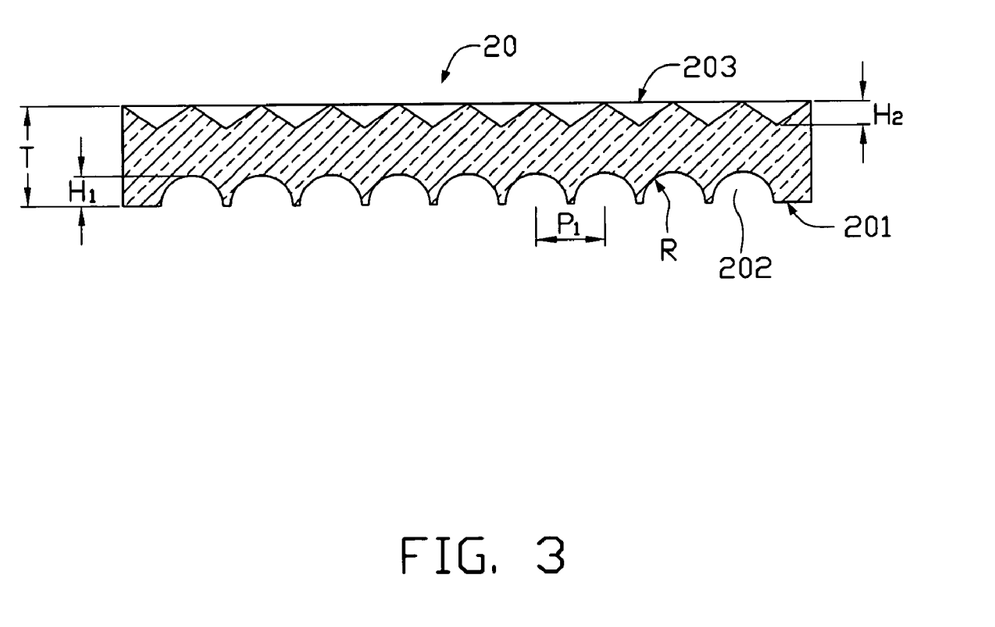
FIG. 3 is a cross-sectional view of the optical plate of FIG. 2, taken along line III-III.

Referring to FIGS. 2 and 3, the optical plate 20 includes a first surface 201 and an opposite second surface 203. The first surface 201 defines a plurality of elongated, arc-shaped depressions 202. A plurality of first elongated, V-shaped protrusions 204 are aligned in a first direction Y and a plurality of second elongated, V-shaped protrusions 205 are aligned in a second direction extending from the second surface 203. The first direction Y and the second direction X cooperatively define an angle which is about 0 degrees to about 90 degrees. An extending direction of the elongated, arc-shaped depressions 202 is substantially parallel to edges of the optical plate 20.

The elongated, arc-shaped depressions 202 are aligned side by side on the first surface 201 of the optical plate 20. Each elongated, arc-shaped depression 202 may have a semi-circular cross-section taken along a direction perpendicular to the extending direction thereof. A pitch $P_1$ between adjacent elongated, arc-shaped depressions 202 is about 0.025 millimeters (mm) to about 1.5 mm. A radius R of a circular arc defined by the semi-circular cross section taken along a direction perpendicular to the extending direction of the elongated, arc-shaped depressions 202 is equal to or larger than 0.01 mm, and less than 3 mm. A depth $H_1$ of each elongated, arc-shaped depression 202 is equal to or larger than 0.01 mm, and less than 3 mm.

Each first elongated, V-shaped protrusion 204 may have a triangular cross section taken along a direction perpendicular to an extending direction of the first elongated, V-shaped protrusions 204. A vertex angle of the triangular cross section is about 80 degrees to about 100 degrees. A pitch $P_2$ between adjacent first elongated, V-shaped protrusions 204 is about 0.025 mm to about 1.5 mm.

Each second elongated, V-shaped protrusion 205 has a triangular cross section taken along a direction perpendicular to an extending direction of the second elongated, V-shaped protrusions 205. A vertex angle of the triangular cross section is about 80 degrees to about 100 degrees. A pitch $P_3$ between adjacent second elongated, V-shaped protrusions 205 is about 0.025 mm to about 1.5 mm. In addition, a height $H_2$ of the first elongated, V-shaped protrusions 204 and the second elongated, V-shaped protrusions 205 is equal to or larger than 0.01 mm, and less than 3 mm.

A thickness T of the optical plate 20 is about 0.5 mm to about 3 mm. The optical plate 20 may be made of transparent material such as polycarbonate (PC), polymethyl methacrylate (PMMA), polystyrene (PS), copolymer of methylmethacrylate and styrene (MS), and any suitable combination thereof.

Referring to FIG. 1 again, each lamp 22 may be replaced by a plurality of point light sources, such as light emitting diodes, distributed along a line. In the illustrated embodiment, the lamps 22 are cold cathode fluorescent lamps. The interior of the frame 21 is highly reflective.

The optical plate 20 is positioned on the frame 21 such that the first surface 201 is adjacent to the lamps 22, and an extending direction of the lamps 22 is substantially parallel to the extending direction of the elongated, arc-shaped depressions 202. Light enters the optical plate 20 via the first surface 201. Since the inner surfaces of the elongated, arc-shaped depressions 202 are curved and the outer surface of the first elongated, V-shaped protrusions 204 and the second elongated, V-shaped protrusions 205 are slanted, incident light that may have been internally reflected on a flat surface, are refracted, reflected, and diffracted. As a result, light outputted from the second surface 203 is more uniform than light outputted from a light output surface of the typical prism sheet 10. Since strong light spots of the light sources seldom occur, an extra upper light diffusion film on the optical plate 20 is unnecessary. Thus, the efficiency of light utilization is enhanced.

Referring to the Table 1 below, test samples are provided.

TABLE 1

| Test samples | Condition |
|---|---|
| 1 | LED |
| 2 | LED + prism sheet 10 |
| 3 | LED + optical plate 20 |

Figure 4:
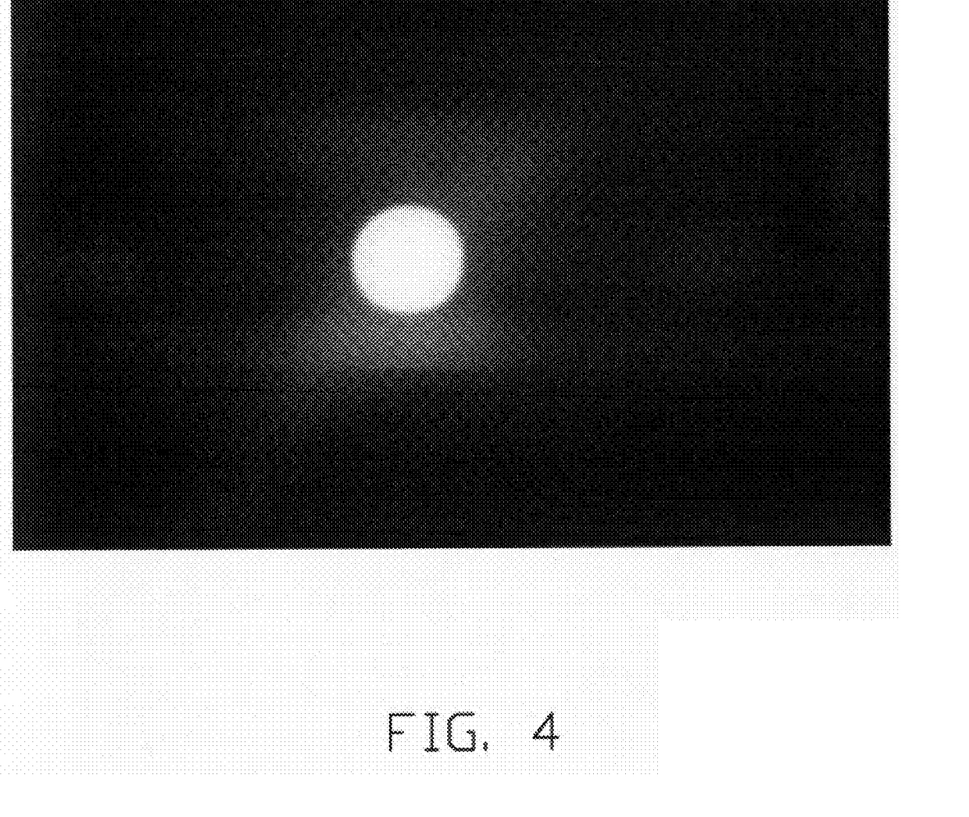
FIG. 4 is a photo showing an illumination distribution testing light of an LED.
Figure 5:
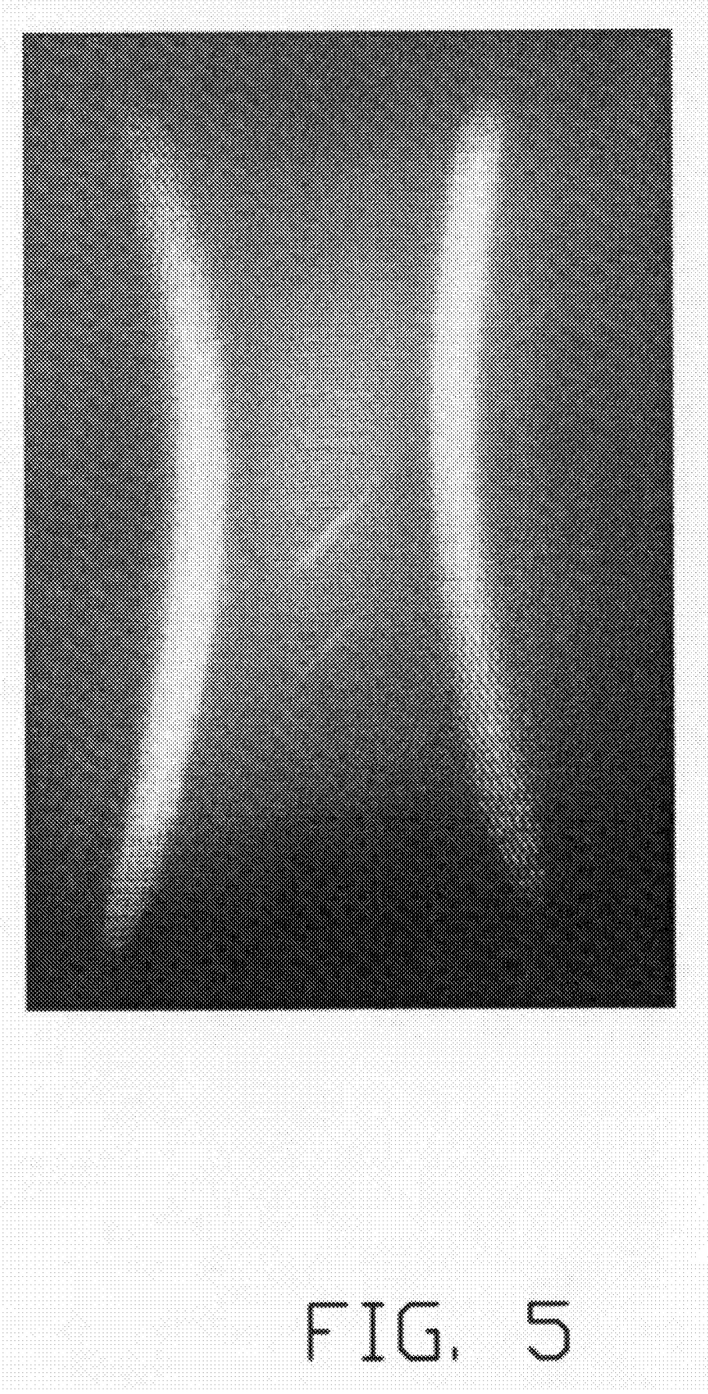
FIG. 5 is a photo showing an illumination distribution testing light of an LED passing through the optical plate of FIG. 2.
Figure 10:
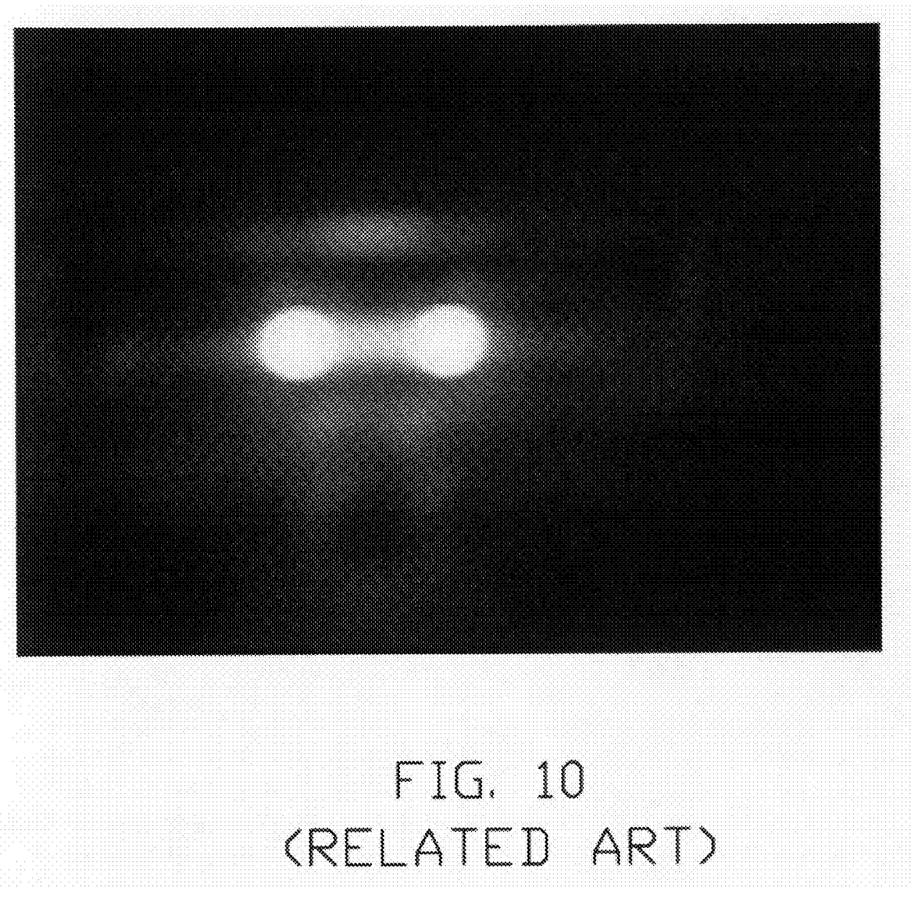
FIG. 10 is a photo showing an illumination distribution testing light of an LED passing the prism sheet in FIG. 9.

FIGS. 4, 5, and 10 reflect the test results from the test conditions in Table 1. As can be seen, light spots formed on the typical prism sheet 10 are relatively strong. In contrast, light spots formed on the optical plate 20 are relatively weak. Therefore, the test results show light emitting from the optical plate 20 is more uniform.

Moreover, in contrast to the typical prism sheet 10, the optical plate 20 may be integrally formed by injection molding technology. Injection molding technology is easier to mass-produce than the typical prism sheet 10. Typical prism sheets 10 are formed by solidifying melted ultraviolet-cured transparent resin, and as such, the prism lenses are easily damaged due to poor rigidity and mechanical strength and scratched. The optical plate 20 has better rigidity and mechanical strength, and therefore, has a relatively high reliability.

Figure 6:
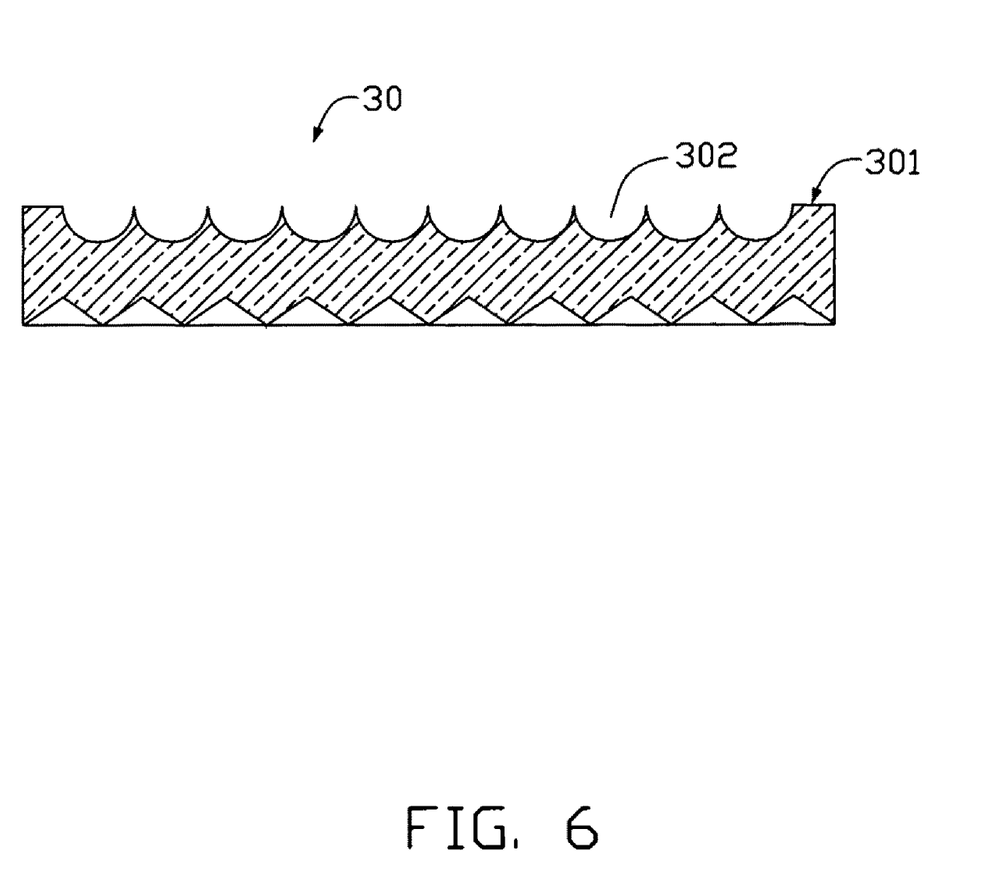
FIG. 6 is a cross-sectional view of a second embodiment of an optical plate.

Referring to FIG. 6, a second embodiment of an optical plate 30 is similar in principle to the optical plate 20. The first surface 31 defines a plurality of elongated, arc-shaped depressions 302. A plurality of first elongated, V-shaped protrusions (not labeled) and a plurality of elongated, V-shaped protrusions (not labeled) protrude from the second surface (not labeled). The first elongated, V-shaped protrusions intersect with the second elongated, V-shaped protrusions. However, each of the elongated, arc-shaped depressions 302 has a semi-elliptical cross section taken along a direction perpendicular to an extending direction thereof.

Figure 7:
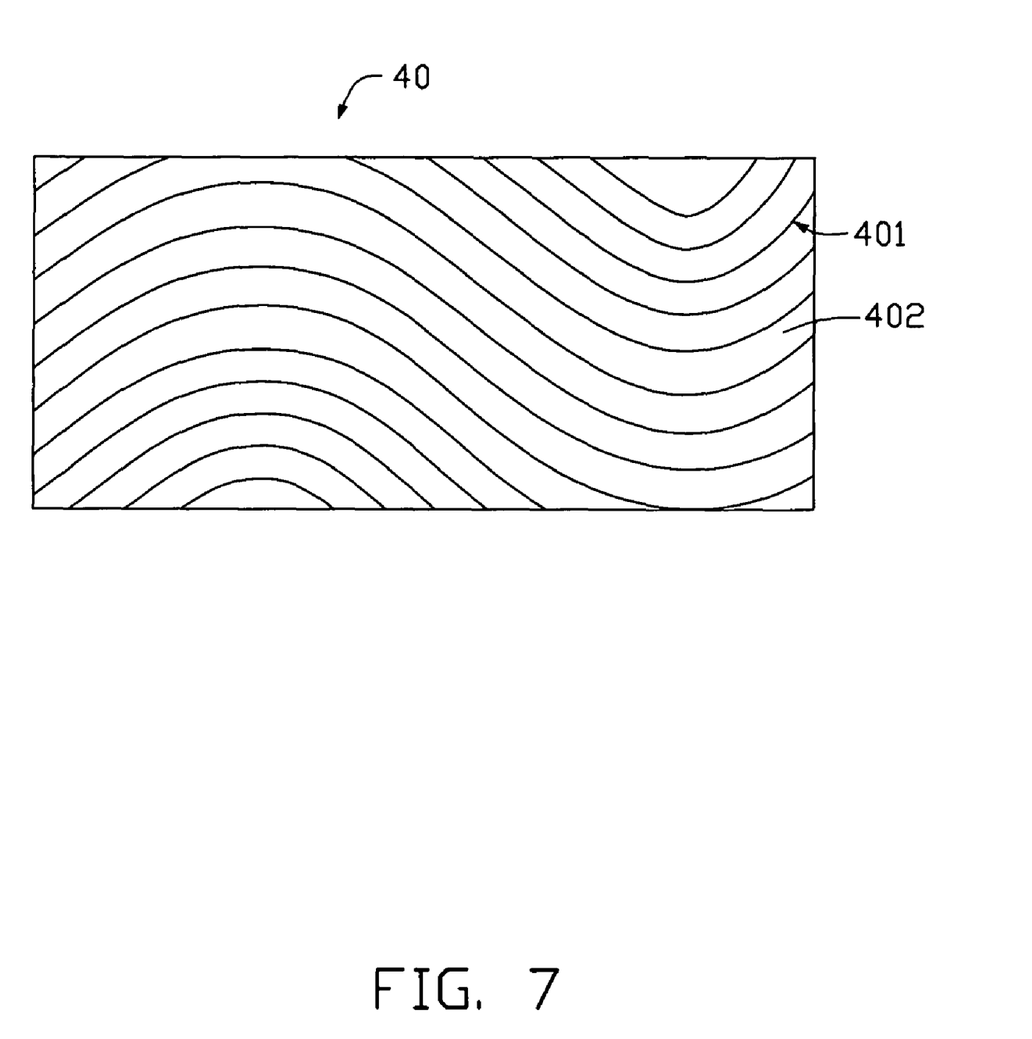
FIG. 7 is a bottom plane view of a third embodiment of an optical plate.

Referring to FIG. 7, a third embodiment of an optical plate 40 is similar in principle to the optical plate 20. The first surface 401 defines a plurality of elongated, arc-shaped depressions 402. However, each of the elongated, arc-shaped depressions 402 extends along an imaginary curved line. Thus moiré patterns, caused by the pixels of a liquid crystal display panel and the structural patterns of a typical prism sheet can be minimized or eliminated.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An optical plate, comprising:
a first surface;
a second surface opposite to the first surface;
a plurality of elongated, arc-shaped depressions defined in the first surface; and
a plurality of first elongated, V-shaped protrusions aligned in a first direction; and
a plurality of second elongated, V-shaped protrusions aligned in a second direction extending from the second surface, wherein the first direction and the second direction cooperatively define an angle larger than 0 degrees and less than 90 degrees.

2. The optical plate according to claim 1, wherein each of the elongated, arc-shaped depressions has one of a semi-elliptical and a semi-circular cross section taken along a direction perpendicular to an extending direction thereof.

3. The optical plate according to claim 2, wherein a radius of a circular arc defined by the semi-circular cross section taken along a direction perpendicular to the extending direction of the elongated, arc-shaped depressions is equal to or larger than 0.01 mm, and less than 3 mm.

4. The optical plate according to claim 1, wherein adjacent elongated, arc-shaped depressions are regularly spaced apart from each other.

5. The optical plate according to claim 1, wherein the elongated, arc-shaped depressions are aligned side by side on the first surface of the optical plate.

6. The optical plate according to claim 1, wherein a pitch between adjacent elongated, arc-shaped depressions is about 0.025 mm to about 1.5 mm.

7. The optical plate according to claim 1, wherein a depth of each elongated, arc-shaped depression is equal to or larger than 0.01 mm, and less than 3 mm.

8. The optical plate according to claim 1, wherein each of the first elongated, V-shaped protrusions has a triangular cross section taken along a direction perpendicular to an extending direction thereof.

9. The optical plate according to claim 8, wherein a vertex angle of the triangular cross section is about 80 degrees to about 100 degrees.

10. The optical plate according to claim 1, wherein a pitch between adjacent first elongated, V-shaped protrusions is about 0.025 mm to about 1.5 mm.

11. The optical plate according to claim 1, wherein a height of each first elongated, V-shaped protrusion is equal to or larger than 0.01 mm, and less than 3 mm.

12. The optical plate according to claim 1, wherein each of the second elongated, V-shaped protrusions has a triangular cross section taken along a direction perpendicular to an extending direction thereof.

13. The optical plate according to claim 12, wherein a vertex angle of the triangular cross section is about 80 degrees to about 100 degrees.

14. The optical plate according to claim 1, wherein a pitch between adjacent second elongated, V-shaped protrusions is about 0.025 mm to about 1.5 mm.

15. The optical plate according to claim 1, wherein a height of each second elongated, V-shaped protrusion is equal to or larger than 0.01 mm, and less than 3 mm.

16. A backlight module, comprising:
a frame;
a plurality of lamps positioned in an inner side of the frame; and
an optical plate positioned on the frame above the lamps, comprising:
a first surface;
a second surface opposite to the first surface;
a plurality of elongated, arc-shaped depressions defined in the first surface; and
a plurality of first elongated, V-shaped protrusions aligned in a first direction and a plurality of second elongated, V-shaped protrusions aligned in a second direction extending from the second surface, wherein the first direction and the second direction cooperatively define an angle which is larger than 0 degrees and less than 90 degrees.

17. The backlight module according to claim 16, wherein the first surface faces the lamps.

18. The backlight module according to claim 16, wherein the light sources are linear light sources; an extending direction of the light sources is substantially parallel to that of the elongated, arc-shaped depressions.

19. The backlight module according to claim 16, a pitch between adjacent elongated, arc-shaped depressions is about 0.025 mm to about 1.5 mm, and a depth of each elongated, arc-shaped depression is equal to or larger than 0.01 mm, and less than 3 mm.

20. The backlight module according to claim 16, wherein a pitch between adjacent second elongated, V-shaped protrusions is about 0.025 mm to about 1.5 mm, and a height of each second elongated, V-shaped protrusion is equal to or larger than 0.01 mm, and less than 3 mm.

* * * * *